United States Patent [19]

Wada et al.

[11] Patent Number: 5,295,524
[45] Date of Patent: Mar. 22, 1994

[54] LOCKING MECHANISM FOR PLANING BLOCK OF PLANING MACHINE

[75] Inventors: Tatsuya Wada; Mitsumasa Sato; Kouichi Miyamoto, all of Tokyo, Japan

[73] Assignee: Ryobi Limited, Tokyo, Japan

[21] Appl. No.: 965,806

[22] Filed: Oct. 23, 1992

[30] Foreign Application Priority Data

Oct. 25, 1991 [JP] Japan .................. 3-087811[U]

[51] Int. Cl.⁵ ................................. B27C 1/00
[52] U.S. Cl. ...................... 144/114 R; 144/130
[58] Field of Search ............ 144/114 R, 117, 130, 144/131

[56] References Cited

U.S. PATENT DOCUMENTS 2,779,362  1/1957  Hess ..................... 144/130
3,206,860  9/1965  Warrick .............. 144/130

FOREIGN PATENT DOCUMENTS 62-41768  10/1987  Japan .

Primary Examiner—W. Donald Bray
Attorney, Agent, or Firm—Brooks & Kushman

[57] ABSTRACT

A locking mechanism for a planning block comprises a locking part formed on the axle of a planing block, a locking plate which has a combined hole formed with a hole for locking the locking part to stop the rotation of the planing block and a hole for unlocking the locking part to allow the planing block to rotate, and a cover to move the locking plate in the direction to lock the planing block when opened and in the direction to unlock when closed, thereby enabling the planing block to be locked whenever the cover is opened.

5 Claims, 3 Drawing Sheets

LOCKING MECHANISM FOR PLANING BLOCK OF PLANING MACHINE

BACKGROUND OF THE INVENTION

The present invention relates to a locking mechanism for a planing block with blades of a planing machine.

A conventional planing machine has a locking mechanism for locking the planing block to fasilitate replacing and positioning plane blades on the planing block and to ensure safety during the replacement or positioning work.

Such a conventional locking mechanism employs a structure disclosed in Utility Model Publication No. 62-41768. This mechanism comprises a number of grooves formed on the axis of a planing block, and a locking lever having a locking piece to be detachably engbaged with one of the grooves, which is rotatably fitting on a frame supporting the planing block. The locking lever is constatly urged by a spring towards the direction to lock the locking piece in a groove. In order to keep the locking piece away from the grooves against the urging force of the spring, the locking lever has a hole into which a stopping pin on the frame is inserted. Therefore, when the blades are replaced, the locking lever is bent to take out the stopping pin from the hole and then the locking lever is rotated so that the locking piece is inserted in a groove for the replacement of the blades. In this way, the planing block is locked and replacement of plane blades is conducted. For adjusting position of plane blocks, the stopping pin is taken out of the hole in the locking lever to cause the locking lever to rotate so that the locking piece is held in a groove for the positioning, which locks the planing block and the positioning work is conducted. When the replacement or positioning is completed, the planing block is unlocked by inserting the stopping pin into the hole in the locking lever.

However, the above conventional mechanism requires that the planing block is kept unlocked by inserting the stopping pin into the hole in the locking lever, when no replacement or positioning of plane blocks is conducted. In other words, the locking/unlocking of the planing block is not interlocked with opening/closing of a cover for the planing block. Therefore, the cover has to be opened to expose the planing block before pulling out the stopping pin from the hole in the locking lever to lock the planing block.

SUMMARY OF THE INVENTION

The object of the present invention is to provide a locking mechanism to lock a planing block in association with opening of the cover thereof.

In order to achieve the above object, according to this invention, there is provided a locking mechanism for locking a planing block of a planing machine comprising a locking part formed on an axle of the planing block, a locking plate which has a combined hole including a hole for locking said locking part on said axle thereby preventing the rotation of the planing block and a hole for unlocking said locking part thereby allowing the planing block to rotate, a cover to press down said locking plate when it covers said planing block so that said hole for unlocking in the locking plate is engaged with said locking part and also to release the locking plate when it uncovers the planing block, an urging member for urging said locking plate so that said hole for locking is engaged with the locking part when said cover releases said locking plate, and a guiding unit along which said locking plate travels when the locking plate is moved in association with opening and closing of said cover.

When the cover is opened for replacement of plane blades or inside inspection of the planing machine, the locking plate is released from the pressure of the cover, and moves along the guiding unit towards the cover under the urging force of the urging member. Then, the planing block rotates for a while until the hole for locking the planing block in the locking plate is engaged with the locking part on the planing block axle, which stops the rotation of the planing block. Therefore, when the cover is opened, the planing block is always locked. Operators can change or adjust the position of plane blades safely, as the planing block stays unmoved.

If the cover is closed, the locking plate is moved in the direction opposite to the above, and after a short while the hole for unlocking the block axis is engaged with the locking part loosely, thereby allowing the planing block to rotate.

DESCRIPTION OF THE PREFERRED EMBODIMENTS

An embodiment of a locking mechanism for a planing block according to this invention will now be explained with reference to the accompanying drawings.

Figure 1:
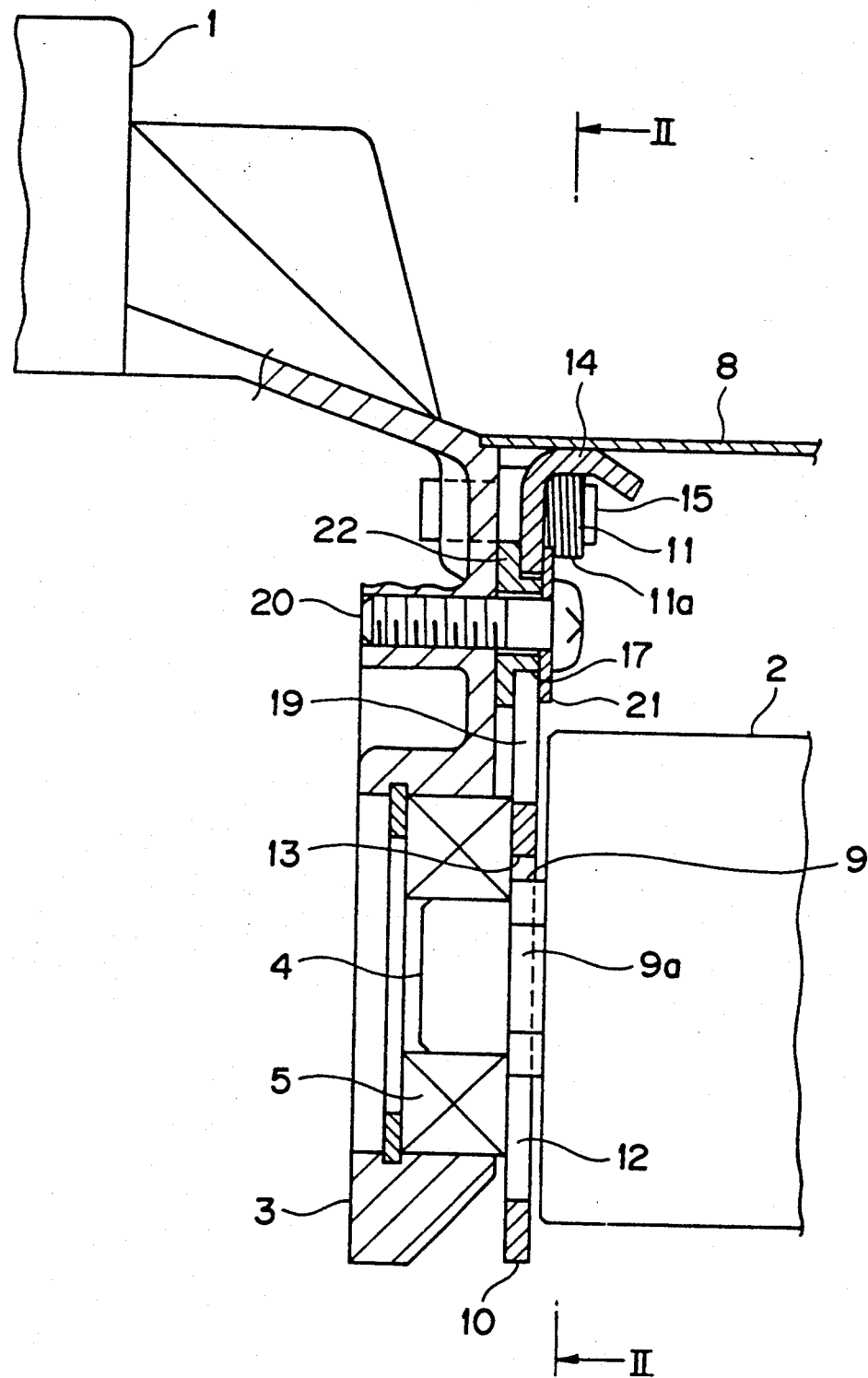
FIG. 1 is a vertical-sectional view showing a part of a locking mechanism for a planing block according to the present invention.
Figure 2:
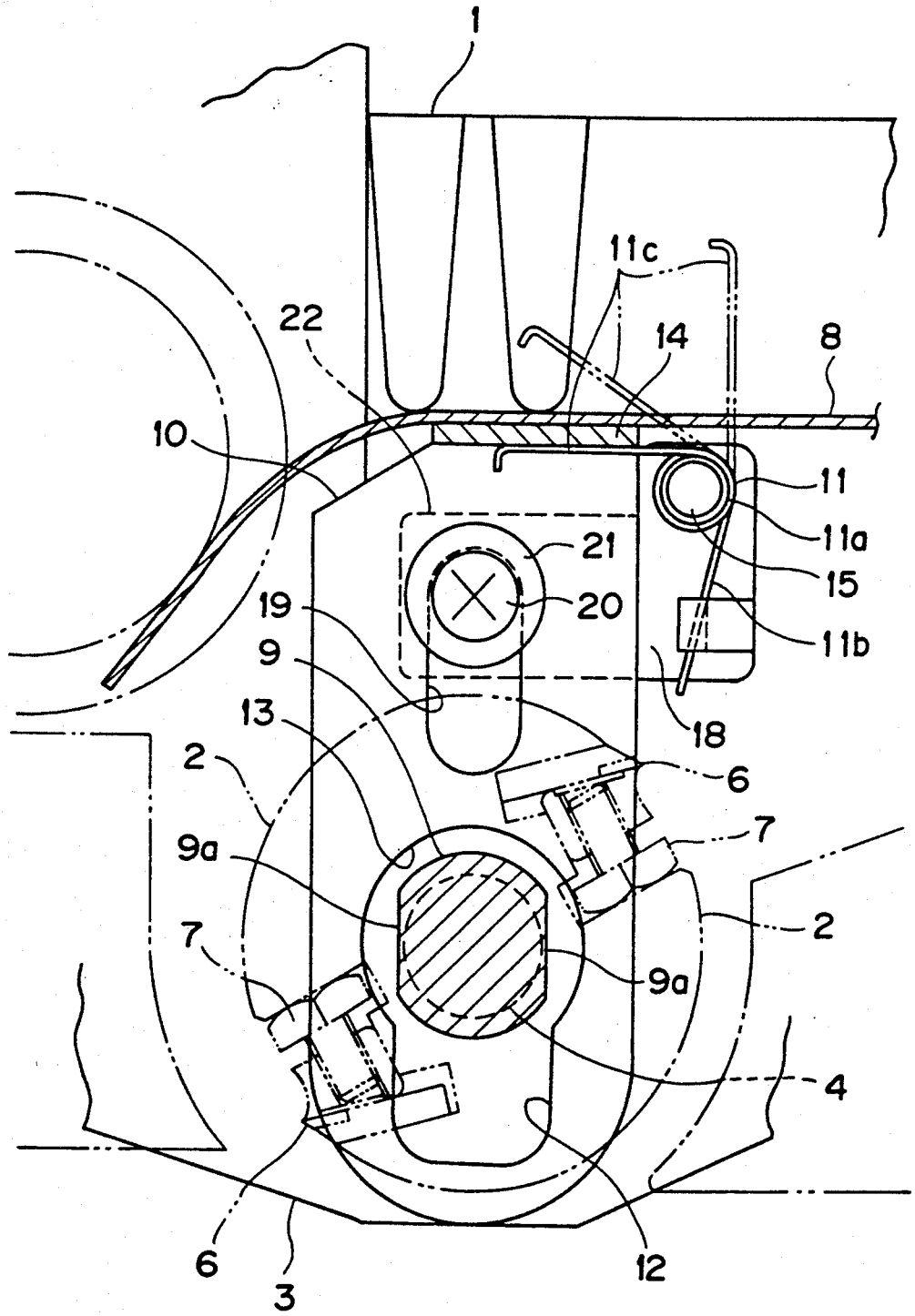
FIG. 2 is a vertical section taken along the line II—II of FIG. 1.
Figure 3:
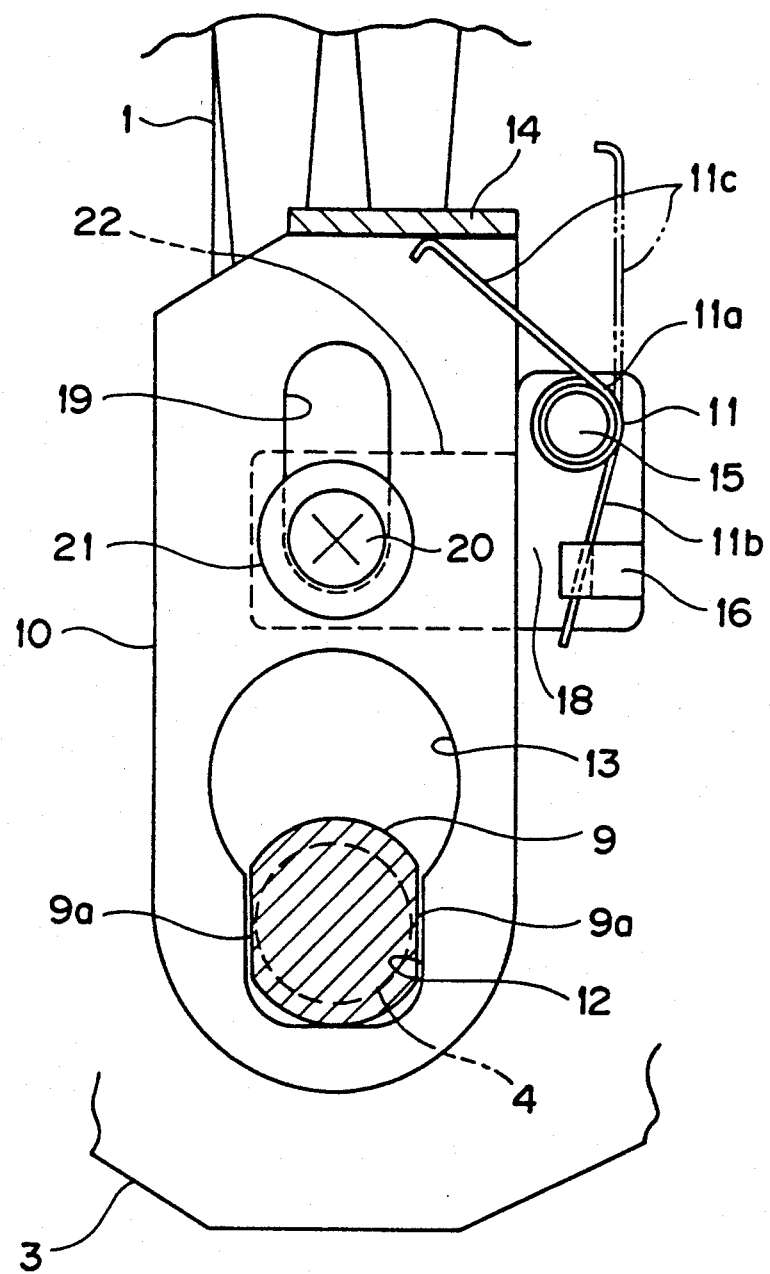
FIG. 3 is a sectional view similar to FIG. 2, showing the locking mechanism being locked.

As shown in FIGS. 1 to 3, a planing machine has a frame 1 fitted with a bracket 3 to support a planing block 2. The planing block 2 is supported in a horizontal position in a manner that both ends of an axle 4 thereof is inserted into the bracket 3 via bearings 5.

The planing block 2, as shown in FIG. 2, has a pair of blades 6 each fastened thereon by a fastening screw 7 in such a manner that the blade 6 can be adjusted for positioning. The blade 6 may be removed from the planing block 2 by loosening the fastening screws 7 and may also be slid back and forth for position adjustment.

The frame 1 is linked to a cover 8 for covering and uncovering the planing block 2.

As shown in FIGS. 1 to 3, the locking mechanism for the planing block 2 includes a locking part 9 (non-circular-sectional part) formed on the axle 4 of the planing block 2, a locking plate 10 to lock or unlock the locking part 9 on the axle 4 thereby locking or unlocking the planing block 2, the cover 8 to press the locking plate 10 to unlock the planing block 2 when it covers the planing block 2 and to release the locking plate 10 when it uncovers the planing block 2, an urging member 11 for urging the locking plate 10 so as to lock the planing block 2 when the cover 8 releases the locking plate 10, and a guide unit to guide the locking plate 10 when the cover 8 is opened and closed.

The locking part 9 is formed at a root portion of the axle 4, corresponding to an opening of the locking plate 10. The locking part 9 has two cutaway sides 9a, 9a formed in such a manner the outer circumferential surface of the axle 4 is partially cut away along two parallel lines.

The locking plate 10 is located between the planing block 2 and the bracket 3, extending along the wall of the bracket 3. The locking plate 10 has a combined hole which comprises a substantially rectangular hole for locking the planing block 2 and a circular hole 13 for unlocking it. The hole 12 locks the locking part 9 to prevent the rotation of the planing block 2, whereas the hole 13 unlocks the part 9 to allow the planing block 2 to rotate. The hole 12 is a rounded rectangular hole of the same width as that of the locking part 9, and the hole 13 is a circular hole larger in diameter than the locking part 9.

Therefore, if the locking plate 10 is pulled up, the hole 12 is engaged with the locking part 9 to prevent the rotation of the planing block 2. If the locking plate 10 is pressed down, the hole 13 releases the locking part 9 to unlock the planing block 2.

When the cover 8 is closed to cover the planing block 2, it hits the upper end of the locking plate 10 thereby pressing down the locking plate 10. When the cover 8 is opened, it is separated from the upper end of the locking plate 10 release the locking plate 10.

When the cover 8 is closed, the locking polate 10 is lowered to position the axle 4 in the circular hole 13. And when the cover 8 is opened, the locking plate 10 is raised by the urging member 11 and the axle 4 is locked in the rectangular hole 12.

On the upper end of the locking plate 10, a bent piece 14 is fitted to allow the cover 8 to press the locking plate 10.

The urging member 11 is a twist coil spring for urging upword the locking plate 10 so that the rectangular hole 12 engages the locking part 9 when the locking plate 10 is released from the pressure of the cover 8. The coiled part 11a of the twist coil spring is supported by a pin 15 on the bracket 3 in such a manner that the top of the coiled part 11a is aligned with the upper end of the locking plate 10. An arm 11b projecting from one end of the coiled part 11a engages with a projection 16 of the bracket 3. Another arm 11c projecting from the other end of the coiled part 11a contacts the bent piece 14 of the locking plate 10. Consequently, the locking plate 10 is constantly pulled upward, the thus it instantly acts to lock the planing block 2 when the cover 8 is opened.

The guide unit comprises a guide piece 18 fixed to the frame 1 to guide the side face of the locking plate 10 when the locking plate 10 is moved up and down, a spacer plate 22 extended from the guide piece 18 into a space between the surface of the bracket 3 and the locking plate 10, and a guide ring portion 17 formed near the left end of the spaces plate 22 as viewed in FIG. 3 and engaged with a vertical long hole 19. A screw 20 fixed to the bracket 3 penetrates the guide ring portion 17 and a washer 21 is provided between the head of the screw 20 and the top face of the guide ring portion 17. The guide unit ensures that the locking plate 10 can smoothly move vertically with being guided by the guide ring portion and the guide piece 18.

Operation of the above locking mechanism for a planing shell according to this invention is now explained.

If the cover 8 is opened for changing the blades or inside inspection of the planing machine, the locking plate 10 is released from the pressure of the cover 8 and goes up because of the urging force of the urging member 11. The locking plate 10 move smoothly guided by the guide ring portion 17 and the guide piece 18. As the locking plate 10 goes up, the hole 12 is engaged with the locking part 9 of the planing block 2 thereby preventing the rotation of the planing block 2.

With the planing block 2 being locked, an operator can adjust the position of one of the blade 6 or replace one of the blades 6 for a new blade. Then, if the operator presses down the locking plate 10 by hand, the axle 4 moves into the hole 13 to release the plane block 2. Then, the locking plate 10 is rotated by 180 degrees and the other blade 6 comes up and the planing block 2 is locked again. The operator can now replace the plane block or adjust its position, also with the planing block 2 being locked.

If the cover 8 is closed after the completion of the replacement or adjustment, the locking plate 10 is pressed by the cover 8 and lowered against the force of the urging member 11. Then, the locking part 9 comes into the circular hole 13 in the locking plate 10, which allows the planing block 2 to rotate.

Since it is structured as above, a mechanism of this invention prevents the rotation of the planing block by releasing a locking plate when the cover of the planing block is opened for replacement of plane blades or inside inspection of the machine, resulting in moving the locking plate towards the cover under the force of the urging member to stop the rotation of the planing block. Therefore, when the cover 8 is opened, the planing block is locked without fail.

What is claimed is:

1. A locking mechanism for locking a planing block of a planing machine comprising a locking part formed on an axle of the planing block; a locking plate which has a combined hole including a hole for locking said locking part on said axle thereby preventing the rotation of the planing block and a hole for unlocking said locking part thereby allowing the planing block to rotate; a cover to press down said locking plate when it covers said planing block so that said hole for unlocking is engaged with said locking part and also to release the locking plate when it uncovers the planing block, an urging member for urging said locking plate so that said hole for locking is engaged with the locking part when said cover releases said locking plate, and a guiding unit along which said locking plate travels when the locking plate is moved in association with opening and closing of said cover.

2. A locking mechanism according to claim 1, wherein said locking part formed on the axle of the planing block has a shape which comprises two parallel flat surfaces formed in such a manner that an outer circumferential surface of a circular axle is partially cut away.

3. A locking mechanism according to claim 1, wherein said combined hole comprises a circular hole for loosely engaging with the axle of the planing block and a substantially rectangular hole extended continuously from the circular hole.

4. A locking mechanism according claim 1, wherein said guiding unit comprises a guide piece fixed to a frame of the planing machine for guiding a side face of said locking plate, a long hole extended in a direction in which the locking plate is moved and formed on the locking plate, and a guide screw which is fixed to the bracket and inserted into the long hole.

5. A locking mechanism according to claim 1, said urging member is a twist coil spring whose one arm is engaged with a bent piece formed on the locking plate.

* * * * *